(12) United States Patent
Goss

(10) Patent No.: US 7,008,215 B2
(45) Date of Patent: Mar. 7, 2006

(54) MULTIPLE FINISH SPINDLE

(75) Inventor: Kent Goss, Louisburg, KS (US)

(73) Assignee: Graham Packaging Company, L.P., York, PA (US)

( * ) Notice: Subject to any disclaimer, the term of this patent is extended or adjusted under 35 U.S.C. 154(b) by 289 days.

(21) Appl. No.: 10/694,743

(22) Filed: Oct. 29, 2003

(65) Prior Publication Data

US 2005/0092892 A1 May 5, 2005

(51) Int. Cl.
*B29C 31/08* (2006.01)
(52) U.S. Cl. .................. 425/534; 198/617; 198/803.12
(58) Field of Classification Search .......... 198/803.11, 198/803.12, 803.7, 470.1, 617; 425/534; 294/93, 119.1, 902; B29C 31/08
See application file for complete search history.

(56) References Cited

U.S. PATENT DOCUMENTS

| | | | |
|---|---|---|---|
| 2,826,445 A * | 3/1958 | Tidland | 294/98.1 |
| 4,116,325 A * | 9/1978 | McDonald | 198/482.1 |
| 4,291,910 A * | 9/1981 | Maupate | 294/95 |
| 4,572,355 A * | 2/1986 | Hunter | 198/803.12 |
| 4,846,656 A | 7/1989 | Denis et al. | |
| 5,316,127 A | 5/1994 | Evrard | |
| 5,538,304 A * | 7/1996 | Daehne | 294/93 |
| 5,803,291 A | 9/1998 | Valles | |
| 5,857,562 A | 1/1999 | Evrard | |
| 6,106,273 A * | 8/2000 | O'Dell | 425/534 |
| 6,471,038 B1 * | 10/2002 | Yung | 198/487.1 |
| 6,761,556 B1 * | 7/2004 | Pellegatta et al. | 425/534 |
| 2003/0034231 A1 * | 2/2003 | Palisca | 198/803.8 |

FOREIGN PATENT DOCUMENTS

FR 2720681 A1 * 12/1995

* cited by examiner

*Primary Examiner*—Robert B. Davis
(74) *Attorney, Agent, or Firm*—Venable, LLP; James R. Burdett; Jeffri A. Kaminski

(57) ABSTRACT

An apparatus for supporting a preform is provided. The apparatus comprises a shaft defining a groove. A deformable element is arranged in the groove. A split ring having at least two pieces is provided. Each of the pieces has an inner surface facing the deformable member and an outer surface. At least one of the pieces has a protrusion extending from its inner surface. The protrusion is arranged adjacent to the deformable element and the split ring being moveable in a radial direction whereby the protrusion causes the deformable element to be compressed in the groove.

22 Claims, 4 Drawing Sheets

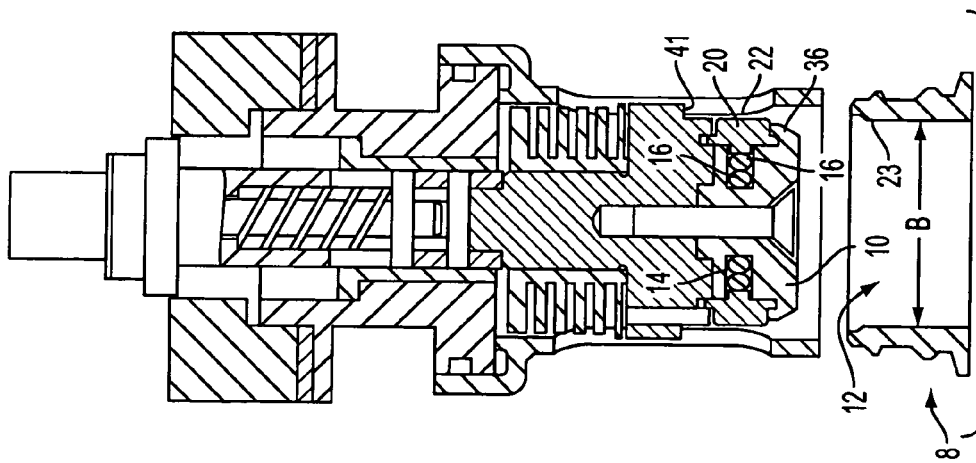
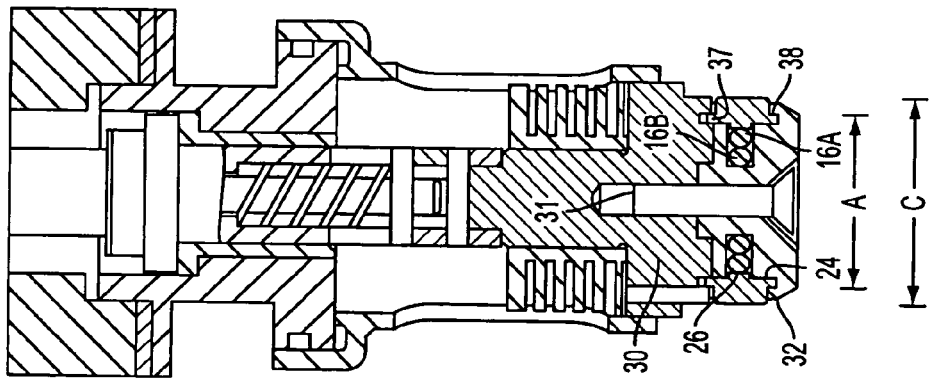

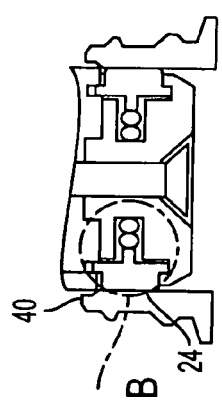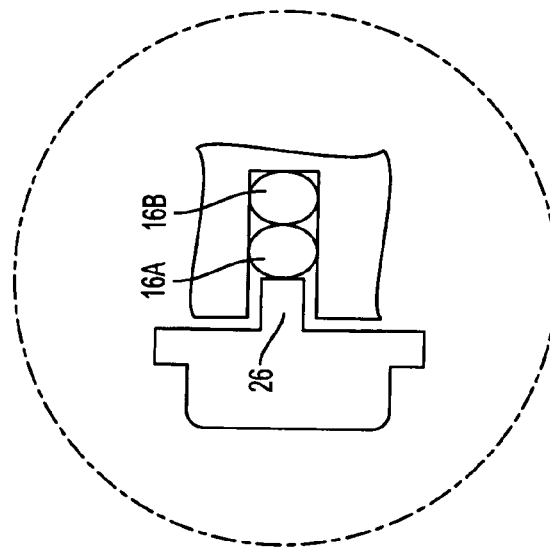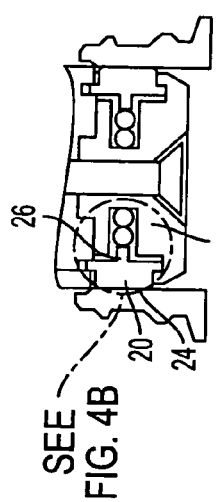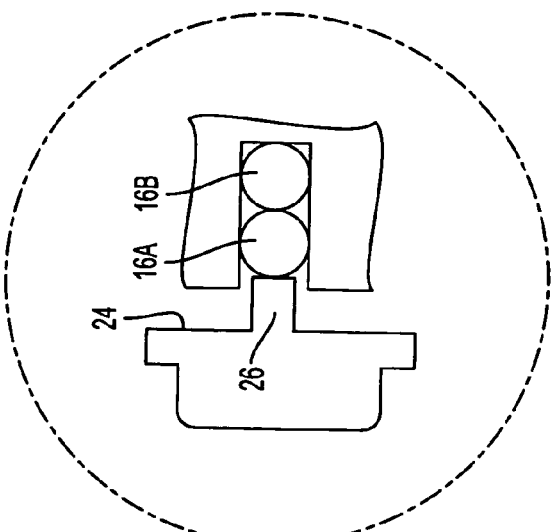

MULTIPLE FINISH SPINDLE

BACKGROUND OF THE INVENTION

1. Field of the Invention

The present invention relates generally to an apparatus and method for supporting a preforms and more particularly to an apparatus and method that can accommodate preforms having different dimensions.

2. Related Art

A preform support device is used to secure a preform in place so that the preform can be moved. Preform support devices can be coupled together in an endless chain for transferring preforms. A preform transfer chain consisting of such devices is found especially in plants for manufacturing containers, such as bottles, flasks or the like, made of a plastic, especially a thermoplastic such as polyethylene terephthalate (PET). More particularly, a transfer chain formed in this way is used to move the preforms from a charging station up to and through a heating oven (tunnel oven) in which the perform material is heated for subsequent molding, by a blow molding or stretch-blow molding process, into a large container (either the final container or an intermediate container). Such a transfer chain is described in U.S. Pat. No. 5,316,127 which is incorporated herein by reference.

A preform support device that can be coupled together one after another to form the transfer chain is described in U.S. Pat. No. 5,857,562 which is incorporated herein by reference. Such a preform support device is shown in FIG. 1. The device 1 includes a hollow body fixed to a mounting plate 2. The body 4 consist of two parts, an upper and a lower part which are fixed in the mounting plate 2, for example, by screwing from above and below the mounting plate. A rod 5 is supported so as to rotate freely in the hollow body 4. Sleeves are provided inside the hollow body 4 to guide the rod. The rod 5 is capable of being moved axially. A spring 6 is provided to return the rod 5 to its starting position. At its free end, the rod 5 is provided with a gripping head 7 designed to be removably or releasably fastened to the open end of a preform 8. The gripping head 7 can be frictionally pressed into the opening of a preform 8.

The gripping head 7 is typically sized to be substantially the same size as or slightly larger than the interior diameter of the opening of the preform. The gripping head 7 is then compressed and secured within the open end of the preform. It is important that the size of the gripping head and the size of the opening in the preform match each other. Otherwise, the gripping head may be to large and will not fit into the opening of the preform or the gripping head may be to small and will not frictionally engage the preform. Thus, each gripping head can only be used with a particular size preform or preforms having openings within a very limited range, typically no variation of 0.006 inches and beyond.

Consequently, in order to use the prior art preform support device or preform transfer chain for preforms of different sizes, the production line must be shut down so that the appropriately sized preform support device for the different sized preforms can be installed. Obviously, this causes a significant delay in production time and a corresponding increase in production cost. Moreover, many different types of preform support devices are required to fit the many different types and sizes of bottles that may be manufactured. Therefore, there is a need for a preform support device than can accommodate multiple size preforms and that eliminates the need for changing over the production line.

BRIEF SUMMARY OF THE INVENTION

In an exemplary embodiment of the invention, an apparatus for supporting a preform is provided. The apparatus comprises a shaft defining a groove. A deformable element is arranged in the groove. A split ring including at least two sections is provided. Each of the sections has an inner surface facing the deformable member and an outer surface. At least one of the sections has a protrusion extending from its inner surface. The protrusion is arranged adjacent to the deformable element. The split ring is moveable in a radial direction whereby the protrusion can cause the deformable element to be compressed in the groove.

In another embodiment of the invention, a multiple finish spindle is provided. The spindle includes a spindle body defining a groove therein. A shell includes at least two pieces disposed around the spindle body. The shell has an outer surface, an inner surface facing the spindle body, and a protruding element arranged on the inner surface. An elastically deformable element is disposed in the groove. The shell is moveable between an uncompressed position and a compressed position in which the shell moves in a radial direction towards the spindle body and the protruding element acts on the deformable element, compressing it in the groove.

In a further embodiment, a method for supporting different size preforms is provided. A support device comprising a shaft defining a groove, a deformable element arranged in the groove, and a split ring having at least two pieces, at least one of the pieces having a protrusion extending from an inner surface is provided. The support device is inserted into a first preform having a first diameter thereby causing the split ring to be compressed a first distance. The support device is removed from the first perform and is inserted into a second preform having a second diameter smaller than the first diameter thereby causing the split ring to be compressed a second distance which is greater than the first distance.

Further objectives and advantages, as well as the structure and function of preferred embodiments will become apparent from a consideration of the description, drawings, and examples below.

BRIEF DESCRIPTION OF THE DRAWINGS

The foregoing and other features and advantages of the invention will be apparent from the following, more particular description of a preferred embodiment of the invention, as illustrated in the accompanying drawings.

FIGS. 2A and 2B depict a cross-sections of an exemplary embodiment of a preform support device according to the present invention;

FIGS. 4A and 4B depict a cross-section of an exemplary embodiment of a preform support device according to the present invention; and FIGS. 5A and 5B depict a cross-section of an exemplary embodiment of a preform support device according to the present invention.

DETAILED DESCRIPTION OF THE PREFERRED EMBODIMENTS

Figure 1:
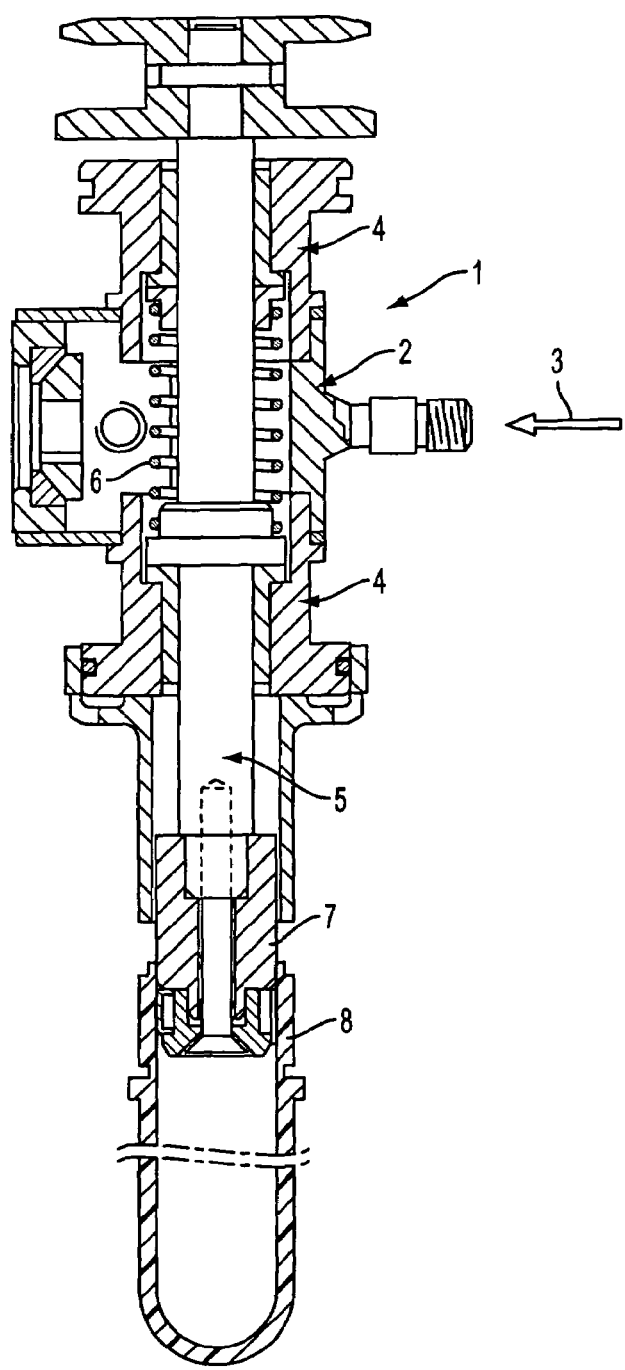
FIG. 1 depicts an exemplary embodiment of a known preform support device.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

FIGS. 2A and 2B are cross sectional views of an exemplary embodiment of a preform support apparatus. The apparatus includes a shaft 10. The shaft 10 is configured to fit into an open end 12 of a preform 8. As most preforms have openings that are generally cylindrical or circular in shape, the shaft 10 has an outer contour with a generally circular shape. The shaft 10 has an outer diameter A that should be smaller than an internal diameter B of the opening 12 of the smallest preform with which the preform support apparatus is intended to be used. The shaft 10 defines a groove 14 therein. The groove 14 preferably extends entirely around the shaft 10. A deformable member 16 is disposed in the groove 14. The deformable member 16 may be comprised of any type of elastomeric, rubber, or other deformable type of material. Typically, the deformable member 16 comprises an elastically deformable O ring. In the embodiment shown in FIG. 2, two O rings 16A, 16B are disposed in groove 14.

A split ring 20 is arranged adjacent to the shaft 10. The split ring 20 is preferably comprised of at least two sections (shown in FIG. 3) disposed around the groove 14 formed in shaft 10. The sections of the split ring 20 form a generally cylindrically shaped hollow body. The split ring 20 includes an outer surface 22. The outer surface 22 is adapted to engage an interior surface 23 of the opening 12 of the preform 8. The split ring 20 also includes an inner surface 24 that faces the groove 14. A projection 26 extends from the inner surface 24. The projection 26 may be a raised step-like portion on inner surface 24, as illustrated in FIG. 2, for example. The projection 26 is preferably sized so that it can be received within groove 14.

The split ring 20 arranged on shaft 10 has an outer diameter C when the perform support apparatus is not inserted into a preform. Diameter C should be substantially the same as or slightly larger than diameter B of the perform 8 with which the apparatus is intended to be used. As can be seen in FIG. 2B, projection 26 is positioned adjacent to the outer most O ring 16A. When the preform support apparatus is inserted into opening 12 of preform 8, outer surface 22 of split ring 20 engages interior surface 23 of opening 12. As the outer diameter C of the split ring 20 is larger than the inner diameter B of the opening 12, the split ring 20 is forced inwardly in a radial direction. The inward movement of the split ring 20 causes protrusion 26 to engage the O rings 16A, 16B, compressing the O rings 16A, 16B as the protrusion 26 moves into groove, as is described in more detail below. The structure of the perform support apparatus allows the split rings to move inwardly a distance at least in the range of 0.004–0.012 inches.

Figure 3:
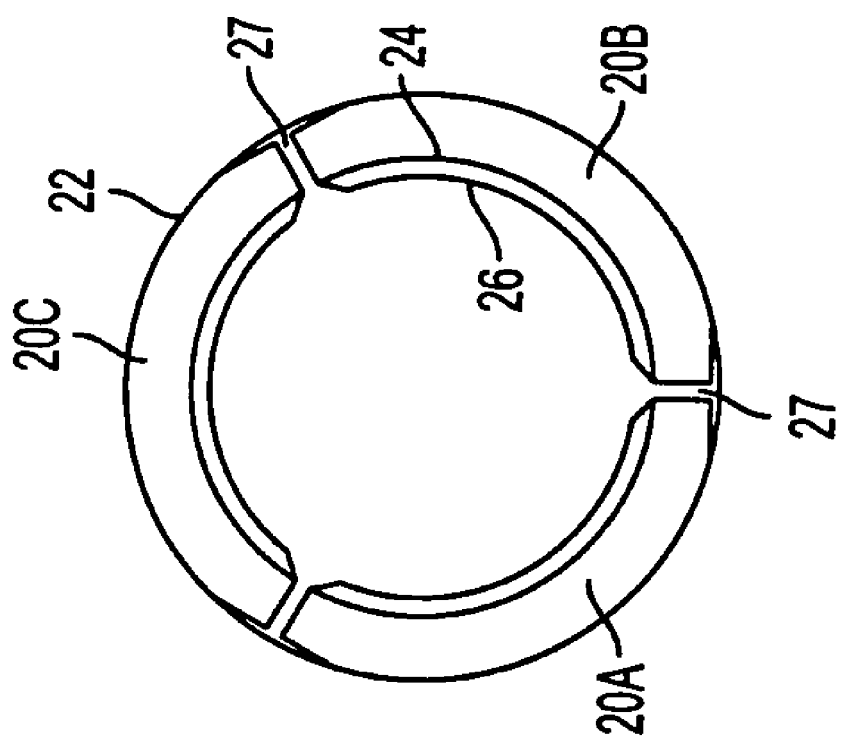
FIG. 3 depicts a cross-section of an exemplary embodiment of a split ring according to the present invention.

FIG. 3 is a cross-sectional view of an exemplary split ring 20 perpendicular to the view shown in FIGS. 2A and 2B. In the embodiment illustrated in FIG. 3, the split ring 20 is comprised of three semi-circular sections 20A, 20B and 20C. Gaps 27 are provided between the various sections 20A–20C. The gaps 27 are provided to allow for radial movement of the sections 20A–20C. The gaps 27 are sized appropriately to accommodate the compression and expansion of the split ring 20 when the preform support apparatus 1 is introduced into and removed from the opening 12 of a preform 8. In the embodiment illustrated, each of the sections 20A–20C is provided with a protrusion 26, although only some of the sections need be. The protrusion 26 is formed as a step like portion that extends from the inner surface 24. In the view of FIG. 2, the inner surface 24 of the split ring 20 extends generally in a vertical direction with the protrusion 26 formed as a step like portion that extends in a horizontal direction.

The sections 20A–20C of the split ring 20 are held in place around groove 14 by the shaft 10 and a spacer body 30. Referring to FIGS. 2A and 2B, the spacer body 30 is attached to shaft 10. The shaft 10 may be provided with a longitudinal bore therethrough. A screw or other fastening element 31 extends through the longitudinal bore and into the spacer body 30, thereby attaching the shaft 10 to the spacer body 30. The split ring 20 is held in place on one side by the shaft 10 and on another side by the spacer body 30. The split ring 20 includes upper and lower boss 37, 38. Preferably each of sections 20A–20C are provided with their own upper and lower bosses. Each of the spacer body 30 and shaft 10 are provided with corresponding recesses that are adapted to receive the upper and lower bosses 37 and 38, respectively, in order to hold the split ring 20 in place. For example, the shaft 10 is provided with a nose portion 32, which is disposed at the end of the shaft 10 that is inserted into opening 12. The nose portion 32 includes a lip 36 that defines a recess which receives the lower boss 38 of the split ring 20. In a corresponding manner, the spacer body 30 defines a recess that is adapted to receive the upper boss 37 of the split ring 20. The recesses provided in the shaft 10 and in the spacer body 30 are configured to accommodate radial movement of the split ring 20 when the perform support apparatus is inserted into and removed from a preform 8.

FIGS. 4 and 5 illustrate the exemplary preform support apparatus described above when inserted into a perform. The performs in FIGS. 4 and 5 have different sized openings. In FIG. 4, the preform support apparatus 1 is inserted into a preform 8 having an opening 12 with a first, larger internal diameter and FIG. 5 illustrates a preform support apparatus 1 inserted into a preform 8 having an opening with a second, smaller diameter. In FIG. 4, the preform 8 has an opening 12 with a first internal diameter B. Internal diameter B is smaller than the outer diameter C of the split ring 20. The preform support apparatus is then inserted into opening 12. The preform support device is introduced inside the opening 12 of the preform 8 until a top edge 40 of the opening 12 in the preform 8 engages an annular shoulder 41 on the spacer body 30. In practice, the preform 8 is offered below the shaft 10, which is then lowered to be introduced into the opening 12 of the preform 8.

The split ring 20 then bears on the interior surface 23 of opening 12. Interior surface 23 of opening 12 engages the outer surface 22 of the split ring 20 and causes the split ring 20 to be compressed and the sections 20A–20C to move radially inward. The sections 20A–20C of the split ring move closer together, making the gaps 27 therebetween smaller. The force of the inward movement of the split ring 20 causes the protrusion 26 to act against the deformable member 16, causing deformation of the deformable member 16. The split ring 20 is compressed radially inward a distance which is equal to the distance between the outer diameter C of the uncompressed split ring and the inner diameter B of the opening 12. The outer diameter C of the split ring 20 is thus reduced and the perform support apparatus is received in the preform.

In turn, the action of the split ring 20 on the deformable member 16 causes a reaction of the deformable member 16.

The elastic properties of the deformable member 16 provide a force that reacts against the force of the protrusion 26. This reaction causes the outer surface 22 of the split ring 20 to frictionally engage the interior surface 23 of opening 12. In this manner, the split ring 20 is frictionally pressed into the opening 12 of the preform 8.

FIG. 5 shows the preform support apparatus 1 introduced into a second perform 8'. The second perform 8' has a second opening 12', that has internal diameter B' that is smaller than inner diameter B of the perform shown in FIG. 4. Diameter B is more than about 0.004 inches greater than diameter B'. Similar to the process describe above, the preform support device is inserted into opening 12 of preform 8 until top edge 40' of opening 12' engages annular shoulder 41 on spacer body 30. The split ring 20 the bears on the interior surface 23 and the sections of the split ring 20 are moved radially inward. The protrusion 26 is received within the groove 14 and compresses the deformable member 16. The elastic properties of the deformable member 16 in turn react against the force of the protrusion 26 and force the split ring 20 radially outward to frictionally engage the interior surface 23 of opening 12. In the manner, the preform support device is frictionally engaged with the preform 8.

In the example shown in FIG. 5, the split ring is move radially inward to a greater extent than in the example shown in FIG. 4. The protrusion 26 allows the split ring 20 to expand and compress to a greater extent and engage a variety of performs of different sizes. The split ring 20 may be compressed until the inner surface 24 of the split ring 20 abuts the shaft 10. Alternatively, the size and characteristics of the protrusion 26, groove 14, and deformable member 16 can define the extent to which split ring 20 can move radially inward. Thus, a preform support device having the design described above can accommodate preforms that have an internal diameter ranging from slightly smaller than the outer diameter of the preform support device when the split ring is uncompressed to a diameter that is slightly larger than the outer diameter of the preform support device when the split ring is fully compressed. The device can accommodate variations of greater than about 0.006 inches in the size of perform openings, and also variations greater than about 0.012 inches. The size of the gap between the split rings, the extent to which the protrusion extends from the back surface of the split ring, and the characteristics of the deformable members can all be dimensioned and selected as necessary for a particular application.

Accordingly, a preform support apparatus that can accommodate preforms having openings of varying diameters is provided. The preform apparatus automatically adapts to the size of the opening of the preform. There is no need to stop the production line and retool in order to be able to change production from one product to another. This provides a great savings in time and eliminates the need for a customized preform support device for each different type of preform used. The apparatus is able to withstand the high heat, high speed, and other environmental factors associated with blow-molding.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. An apparatus for supporting a preform, comprising:
   a shaft defining a groove;
   a deformable element arranged in the groove;
   a split ring having at least two sections each having an inner surface facing the deformable member and an outer surface, at least one of the sections having a protrusion extending from its inner surface, the protrusion being arranged adjacent to the deformable element, and the split ring being moveable in a radial direction whereby the protrusion causes the deformable element to be compressed in the groove.

2. The apparatus of claim 1, further comprising a top portion attached to the shaft.

3. The apparatus of claim 2, wherein the split ring comprises an upper boss received in a first respective recess in the top portion and a lower boss received in a second respective recess in the shaft.

4. The apparatus of claim 3, wherein the shaft further comprises a nosepiece disposed opposite from the top portion.

5. The apparatus of claim 4, wherein the nosepiece forms a lip defining the second recess.

6. The apparatus of claim 1, wherein the split ring includes three sections forming a cylindrical shape around the shaft.

7. The apparatus of claim 6, wherein each of the three sections includes a protrusion.

8. The apparatus of claim 1, wherein split ring protrudes in a radial direction to a larger extent than the shaft.

9. The apparatus of claim 1, wherein the deformable element comprises at least one O-ring.

10. The apparatus of claim 1, wherein the protrusion is a step formed on the inner surface.

11. The apparatus of claim 1, wherein the protrusion is configured to be received in the groove.

12. The apparatus of claim 1, wherein the protrusion directly contacts the deformable member.

13. A multiple finish spindle, comprising:
    a spindle body defining a groove therein;
    a shell including at least two pieces disposed around the spindle body, the shell having an outer surface, an inner surface facing the spindle body, and a protruding element arranged on the inner surface;
    an elastically deformable element disposed in the groove, wherein the shell is moveable between an uncompressed position and a compressed position in which the shell moves in a radial direction towards the spindle body and the protruding element acts on the deformable element, compressing it in the groove.

14. The spindle of claim 13, wherein the protruding element is adapted to enter the groove.

15. The spindle of claim 13, wherein the pieces define a gap therebetween when the shell is uncompressed.

16. The spindle of claim 15, wherein the gap is closed when the shell is in the compressed position.

17. The spindle of claim 13, wherein in the compressed position the inner surface of the shell contacts the spindle body.

18. The spindle of claim 13, wherein the shell has a first outer diameter in the uncompressed position and a second diameter in the compressed position, the second diameter being smaller than the first diameter.

19. The spindle of claim 13, wherein the movement of the shell is in the range of about 0.006 to about 0.012 inches.

20. A method for supporting different size preforms, comprising:
   providing a support device comprising a shaft defining a groove, a deformable element arranged in the groove, and a split ring having at least two pieces, at least one of the pieces having a protrusion arranged adjacent to the deformable element;
   inserting the support device into a first preform having a first diameter causing the split ring and the protrusion move radially inward to a first distance and the split ring to frictionally engage the first preform;
   inserting the support device into a second preform having a second diameter smaller than the first diameter thereby causing the split ring to be move radially inward second distance which is greater than the first distance and the split ring to frictionally engage the second preform.

21. The method of claim 20, wherein the second distance is about 0.006 inches greater than the first distance.

22. The method of claim 20, wherein the second distance is about 0.012 inches than the first distance.

* * * * *